Figure 3:
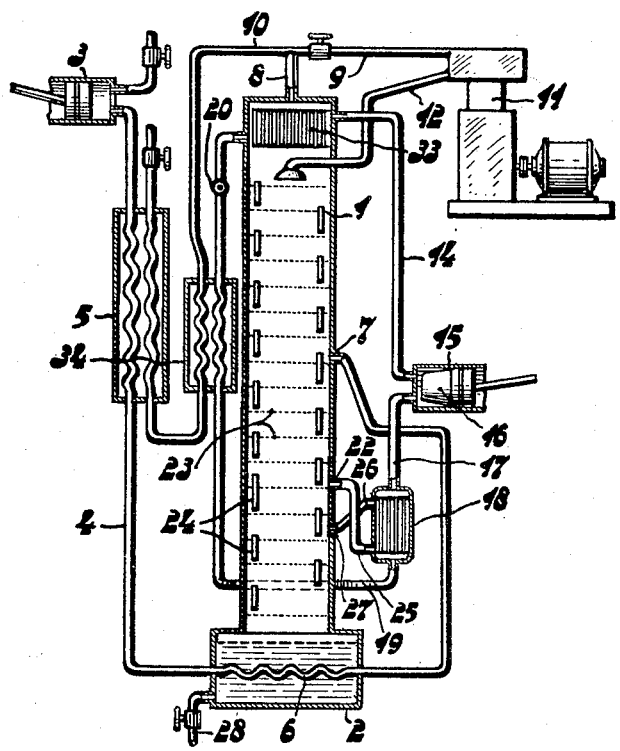

Jan. 5, 1960  J. W. L. KÖHLER  2,919,554
METHOD OF FRACTIONATING GAS MIXTURES BY MEANS OF A GAS
FRACTIONATING SYSTEM COMPRISING A RECTIFYING COLUMN
Filed July 8, 1955  2 Sheets-Sheet 1
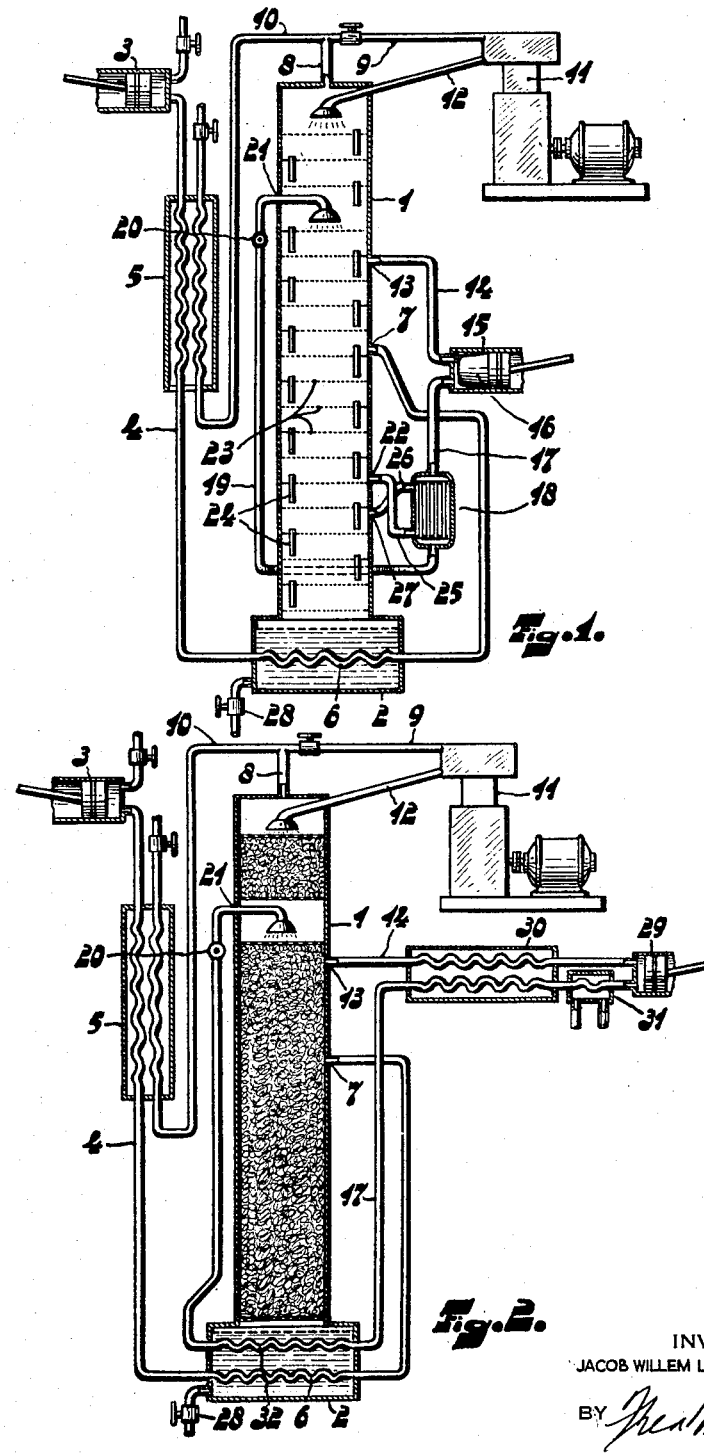
INVENTOR
JACOB WILLEM LAURENS KÖHLER
BY
AGENT United States Patent Office 2,919,554
Patented Jan. 5, 1960

2,919,554

METHOD OF FRACTIONATING GAS MIXTURES BY MEANS OF A GAS FRACTIONATING SYSTEM COMPRISING A RECTIFYING COLUMN

Jacob Willem Laurens Köhler, Eindhoven, Netherlands, assignor, by mesne assignments, to North American Philips Company, Inc., New York, N.Y., a corporation of Delaware Application July 8, 1955, Serial No. 520,893

Claims priority, application Netherlands July 13, 1954

2 Claims. (Cl. 62—11)

The invention relates to a method of fractionating gas mixtures in a gas fractionating system comprising a rectifying column to which the gas mixture to be fractionated is supplied at a point situated between the hot end and the cold end of the gas fractionating part of the column, provision being made of a pipe system containing a medium which after compression supplies thermal energy to the column at a point below the inlet for the gas mixture into the column and which subsequently after expansion extracts thermal energy from the column at a point above the inlet for the gas mixture, the medium being again drawn off from the column in order to be subjected to the compression and the subsequent expansion.

In a known method the medium supplies thermal energy to the column due to evaporation of the fraction with the highest boiling point contained in the boiler of the column; the vapour produced is supplied to the column. At the upper end of the column a condenser may be provided in which the said medium extracts thermal energy from the column and in which the fraction with the lowest boiling point condenses at least partially, so that the medium performs a closed cycle. Alternatively the medium may be one of the fractions or the gas mixture to be fractionated. In this event there may be an open cycle. Thus, gaseous medium may be withdrawn from the column to be supplied after compression, heat-emission and expansion as a liquid to the column, thus extracting thermal energy from the column.

It has been found that in the known method the amount of excess reflux liquid is not the same throughout the height of the column. In the known method a large excess of reflux liquid is available at the top and at the bottom of the column, which excess gradually decreases, however, towards the inlet.

It is an object of the invention to provide a method of fractionating gas mixtures by means of a gas fractionating system comprising a rectifying column, in which thermal energy is supplied to and extracted from the column in a manner such as to make the amount of excess reflux liquid in the part of the column above the inlet or in the part below the inlet or in both parts more uniform, so that a saving in energy is obtained.

According to the invention at least one of the said heat-exchange processes is effected between the inlet of the gas mixture and the end of the gas fractionating part of the column associated with this heat-exchange process.

Thus, in the method in accordance with the invention the medium can supply thermal energy to the column between the inlet for the gas mixture and the end of the column which has the highest temperature. Alternatively the medium may extract thermal energy between the inlet and the end of the column which has the lowest temperature. Thus, a gas-fractionating part is provided either between the point at which the medium supplies thermal energy and the hot end of the column or between the point at which the medium extracts thermal energy and the cold end of the column. The medium may perform an open cycle or a closed one.

In one embodiment of the invention both heat-exchange processes are effected between the inlet for the gas mixture and the ends of the gas-fractionating part of the column with the result that a particularly favourable distribution of the reflux liquid is obtainable.

The above-described methods in accordance with the invention can be carried out to particular advantage if one of the fractions is to be produced in the liquid state. If air is fractionated, according to a further aspect of the invention the method can be used especially when oxygen is to be produced in the liquid state.

According to a further method, in normal operation the highest temperature produced in the operating space or a reciprocating compressor by which the medium is compressed is less than 0° C. so that the heating of the medium can be reduced and an intermediate heat-exchanger for heating the medium, which may be provided, can be made smaller. In this event it will be desirable that the compressor piston should be provided with a cap so that the part of the piston carrying the piston rings faces a cylinder wall having a higher temperature than the compressed gas.

According to a further aspect of the invention the medium is supplied to the compressor at a temperature which is substantially equal to the temperature of the medium when discharged from the column. In this event the intermediate heat-exchanger can be dispensed with.

According to a further favourable method the medium after expansion is supplied to the column at a point at which the concentration of the liquid available at this point is substantially equal to that of the liquid medium with the result that the reflux liquid in the column retains the correct composition. If thermal energy is supplied to the column at a point between the inlet and the hot end of the column, according to a further method liquid is withdrawn from the column after which the gas mixture produced by evaporation of said liquid is returned to the column at a point at which the composition of the available gas mixture substantially corresponds to that of the gas mixture produced by said evaporation. A reduction of the amount of vapour which is left on expansion of the medium is obtainable if the medium prior to expansion is pre-cooled by means of at least part of the fraction having the lowest boiling-point.

The system by means of which the methods in accordance with the invention can be carried out, which system comprises a rectifying column to which the gas mixture to be fractionated is supplied at a point situated between the hot and cold ends of the gas fractionating part of the column, and which also comprises a pipe-system comprising a compressor and an expansion device, whilst a medium flowing through the pipe-system after compression supplies thermal energy to the column at a point below the inlet for the gas mixture to be fractionated and after expansion extracts thermal energy from the column at a point above said inlet, the medium being again drawn off from the column in order to be subjected to the compression and the subsequent expansion, is characterized in that the pipe-system is arranged such that at least one of said heat-exchange processes is effected between the inlet for the gas mixture and the end of the gas-fractionating part of the column associated with said heat-exchange process.

The invention will now be described more fully with reference to some embodiments shown by way of example in the accompanying drawing, in which Fig. 1 shows a gas-fractionating system in which the medium both supplies thermal energy and extracts thermal energy at points spaced away from the ends of the gas-fractionating part of the column, Fig. 2 shows a system in which thermal energy is extracted at a point spaced away from the cold end of the gas-fractionating part of the column, whilst Fig. 3 shows a system in which thermal energy is supplied at a point spaced away from the hot end of the gas-fractionating part of the column.

The system shown in Fig. 1 comprises a column comprising a gas-fractionating part 1 and a boiler 2. The column is a so-called simple column, i.e. a column in which the gas mixture to be fractionated is supplied at a point situated between the hot and the cold end.

It is assumed that the gas mixture to be fractionated is air and hereinafter the gas mixture to be fractionated will be referred to as air, although the method in accordance with the invention may also be used with other gas mixtures.

The air is supplied by means of a pump 3 and through a pipe 4 comprising heat-exchangers 5 and 6 flows to the column which it enters at 7 and in which it is fractionated. The supplied air is cooled in the heat-exchangers 5 and 6; the heat-exchanger 6 which is arranged in the boiler 2 of the column supplies thermal energy to the liquid oxygen contained in this boiler so that it evaporates in part. The gaseous nitrogen produced escapes from the top of the column through a pipe 8 which divides in two branches 9 and 10. Through the pipe 9 part of the nitrogen is supplied to a gas-refrigerator 11 by means of which the nitrogen is condensed after which the condensation product through a pipe 12 is supplied to the column to act as reflux liquid. The pipe 10 is connected to the heat-exchanger 5 so that the air to be fractionated is pre-cooled by the nitrogen which is drawn off.

At a point 13 situated above the inlet 7 for the air, part of the available gas mixture is drawn off through a pipe 14 and compressed by a compressor 15 which is shown diagrammatically only. The gas drawn off has a low temperature so that the piston of the compressor 15 is provided with an insulating cap 16 in order to prevent difficulties concerning lubrication. Through a pipe 17 the compressed gas mixture flows to an evaporator 18 in which the gas is cooled. Subsequently the gas returns to the column through a pipe 19 comprising an expansion device 20. Due to the expansion at least part of the gas is condensed. The condensation product is supplied to the column at a point at which the concentration of the liquid at least substantially corresponds to that of the condensate. This point 21 is therefore situated above the point 13 at which the gas is drawn off.

At a point 22 below the inlet 7 for the air part of the available liquid is drawn off. In the embodiment shown, the column comprises plates 23 designed in known manner and comprising fall pipes 24 with the result that the level of the liquid on the plates is substantially constant. If required, liquid may alternatively be drawn off from the column in a different manner and other plate constructions may be used. The evaporation of the liquid may alternatively be effected in the column whilst the column may be in the form of a plate column or of a column comprising a filler.

Through a pipe 25 the liquid drawn off from the column flows to the evaporator 18 in which the compressed medium supplies thermal energy to the liquid so that it evaporates, after which the vapour produced is returned through a pipe 26 to the column at a point 27 at which the vapour concentration corresponds at least substantially to that of the supplied vapour. Therefore the inlet point 27 is situated below the outlet point 22. The column is particularly suitable for producing liquid oxygen for which purpose an outlet 28 is provided. The pump 3 supplies the air to be fractionated at a pressure which is sufficient to overcome the pipe resistance between the pump and the column and to remove the gaseous fraction from the column. In the column itself the pressure is substantially atmospheric.

The gas refrigerator 11 may be designed as a displacer engine, as a double-acting engine, as an engine comprising cylinders arranged in the form of a V or as an engine the working chamber of which is combined with that of a hot-gas reciprocating engine. A gas refrigerator is frequently referred to as a refrigerator operating on a reversed hot gas engine principle. Thus, in the system shown in Fig. 1 thermal energy is supplied to, and withdrawn from, the column at points slightly spaced away from the ends thereof.

In the embodiment shown in Fig. 2 parts corresponding to those shown in Fig. 1 are designated similarly. In the column shown in this figure the air is supplied similarly to Fig. 1 and the nitrogen is drawn off similarly.

At a point 13 a gas mixture which acts as the medium which is compressed and expanded is drawn off from the column and supplied to a compressor 29 through a pipe 14. The pipe 14 comprises a heat-exchanger 30 in which the gas mixture is heated with the result that it enters the compressor 29 at a comparatively high temperature, for example +20° C. In the compressor it is compressed and thereupon drawn off through the pipe 17. Since the compression is effected at a high temperature difficulties concerning lubrication of the compressor, as will occur in compressors operating at low temperatures, will not arise. The pipe 17 comprises a water cooler 31 for conducting away the compression heat and a heat exchanger 30 in which the compressed gas mixture is cooled by the gas mixture to be compressed. The pipe 17 also comprises a heat exchanger 32 arranged in the boiler 2 of the column and in which the gas mixture is further cooled. The gas mixture is subsequently expanded in the expansion device 20 and supplied to the column at a point 21 situated above the drawing-off point 13. Liquid oxygen is drawn off from the boiler. In this embodiment the column is designed as a column comprising filler material, such as for example "Raschig" rings. Thus, in this embodiment thermal energy is withdrawn only from the column.

In the system shown in Fig. 3 corresponding parts are again designated similarly to those of Fig. 1. For the sake of simplicity the air supply is shown similarly to Fig. 1. However, in the embodiment shown in Fig. 3 no gas mixture is drawn off from the column but an auxiliary medium, for example nitrogen, performs a closed cycle. For this purpose a condenser 33 is provided in the upper end of the column. From this condenser gas is supplied through a pipe 14 to a compressor 15 operating at a low temperature and subsequently is returned to the condenser 33 through an evaporator 18 and the pipe 19 similarly to Fig. 1.

The pipe 19 comprises an additional heat exchanger 34 in which the gas which has already been cooled in the evaporator 18 is further cooled due to heat-exchanging contact with the fraction having the lowest boiling point, permitting the amount of gas which is left after expansion to be reduced. Thus, in this embodiment additional thermal energy is supplied only to the column.

Although the above described embodiments are used in single columns which operate at substantially atmospheric pressure, the method in accordance with the invention may, if required, be used in different columns, for example in the upper or lower part of a double column, dependent upon the gas mixture to be fractionated or the purity which the products must have.

What is claimed is:

1. A method of fractionating a gas mixture in a rectifying column into a plurality of fractions including a fluid in a gas fractionating system and employing a cold gas refrigerator as a cold source for said rectifying column comprising: supplying said gas mixture to said rectifying column at a point intermediate the hot and cold ends thereof, compressing said fluid and utilizing said fluid at an area situated below the inlet to said column for said gas mixture to supply thermal energy to said column, precooling said fluid prior to expansion by means of at least part of the fraction with the lowest boiling point, expanding said fluid and conducting the same to said column to reduce the temperature thereof at a point situated above said inlet, both of said heat exchanging processes being effected between said inlet and the respective end of the gas fractionating part of said column associated with each of said heat exchange processes.

2. A method of fractionating a gas mixture in a gas fractionating system as claimed in claim 1 wherein said fluid is the same substance as one of said fractions.

References Cited in the file of this patent

UNITED STATES PATENTS

| | | |
|---|---|---|
| 1,119,312 | Pictet | Dec. 1, 1914 |
| 1,426,461 | Claude | Aug. 22, 1922 |
| 2,471,833 | Davis | Oct. 23, 1923 |
| 2,213,338 | De Baufre | Sept. 3, 1940 |
| 2,423,273 | Van Nuys | July 1, 1947 |
| 2,608,070 | Kapitza | Aug. 26, 1952 |

FOREIGN PATENTS

| | | |
|---|---|---|
| 71,286 | Netherlands | Nov. 15, 1952 |

OTHER REFERENCES

Gas Liquefaction and Rectification, by Davies, pages 142, 143 and 144 relied on, published by Longmans, Green and Company.